March 7, 1933.  E. B. MARTER, 3D  1,900,831
ELECTRICAL CONTROL SYSTEM FOR PERMANENT HAIR WAVING APPARATUS
Filed April 22, 1930   6 Sheets-Sheet 2

Inventor:
Ezra Budd Marter 3rd
by his Attorneys.
Howson & Howson

March 7, 1933.  E. B. MARTER, 3D  1,900,831
ELECTRICAL CONTROL SYSTEM FOR PERMANENT HAIR WAVING APPARATUS
Filed April 22, 1930  6 Sheets-Sheet 3

Inventor:
Ezra Budd Marter 3rd
by his Attorneys
Howson & Howson

March 7, 1933.  E. B. MARTER, 3D  1,900,831
ELECTRICAL CONTROL SYSTEM FOR PERMANENT HAIR WAVING APPARATUS
Filed April 22, 1930    6 Sheets-Sheet 4
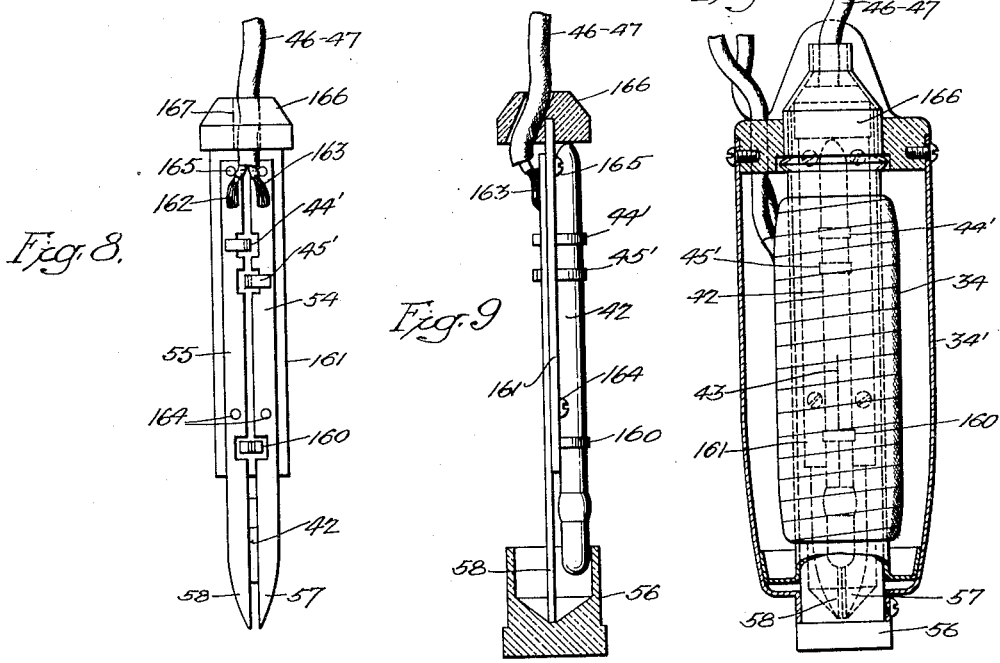
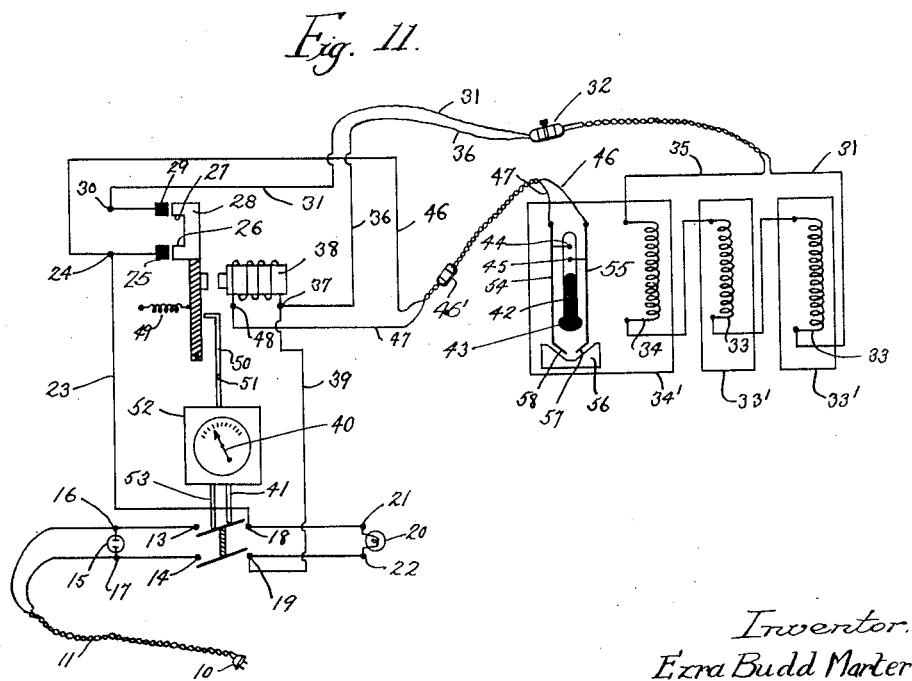
Inventor:
Ezra Budd Marter 3rd
by his Attorneys
Howson & Howson March 7, 1933. E. B. MARTER, 3D 1,900,831
ELECTRICAL CONTROL SYSTEM FOR PERMANENT HAIR WAVING APPARATUS
Filed April 22, 1930 6 Sheets-Sheet 5

Inventor:
Ezra Budd Marter 3rd.
By his Attorneys
Howson & Howson

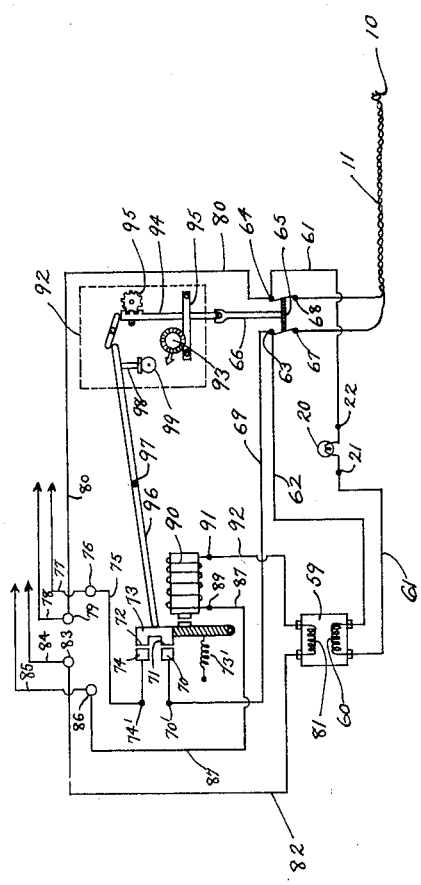
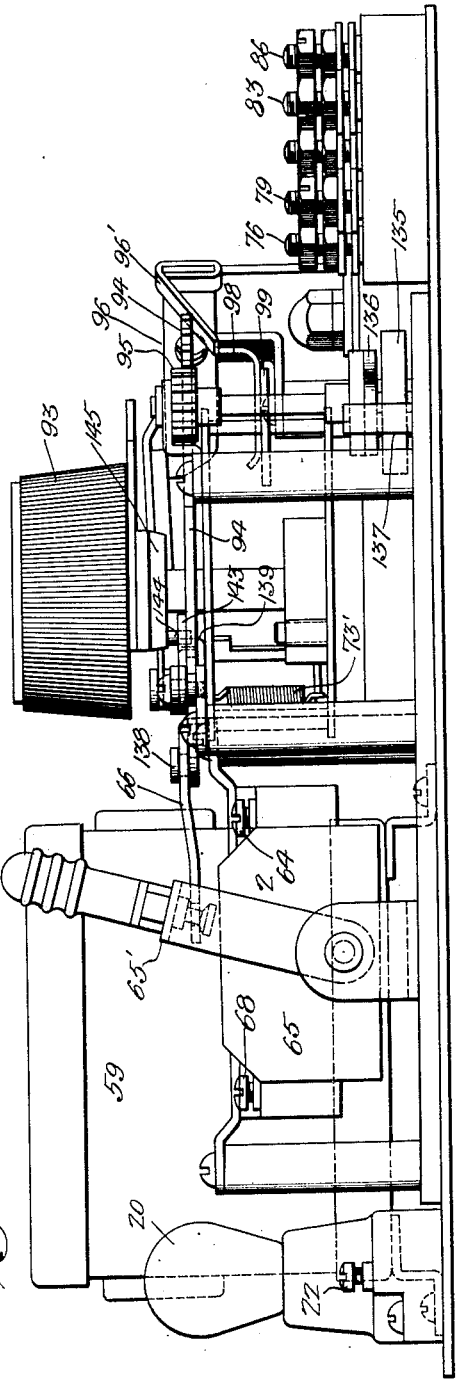

Patented Mar. 7, 1933                                               1,900,831

UNITED STATES PATENT OFFICE

EZRA BUDD MARTER, 3D, OF BURLINGTON, NEW JERSEY, ASSIGNOR TO A. EDMOND PAUSSER, OF PHILADELPHIA, PENNSYLVANIA

ELECTRICAL CONTROL SYSTEM FOR PERMANENT HAIR-WAVING APPARATUS

Application filed April 22, 1930. Serial No. 446,364.

The present invention relates to permanent hair-curling or waving apparatus in which electric heater elements are provided for producing the desired curl or wave and, more particularly, refers to a control system for such apparatus whereby the temperature of said heater elements is automatically regulated to remain substantially constant at a predetermined value and whereby said elements are maintained at the desired temperature for a predetermined time interval and then automatically rendered ineffective.

The broad object of the invention, therefore, is to provide means for automatically controlling the temperature of the heater elements of permanent wave machines and also for eliminating the hazards which are usually due to the operator leaving the machine when it is in operation.

Another object is to provide an apparatus including both a temperature control and a time control which functions to assure that the heaters are maintained at the proper temperature for a proper length of time to effectively impart to the hair the desired wave.

Another object is to provide a device of the class described including means whereby the operator can detect at a glance whether the heating circuit is opened or closed or, in other words, whether or not the waving devices are being heated.

Another object is to provide a control device in combination with the temperature-responsive means for rendering the heater elements ineffective in case of failure of said temperature-responsive means, to prevent existence of excessive temperatures which might cause a burning or overheating of the hair, and thus relieving the operator of the responsibility connected with the heating process.

A further object is to provide a timing mechanism which may be adjusted for a predetermined time interval simultaneously with the closing of the main switch and which is rendered operative when the heater elements have been heated to a predetermined temperature and, after the time interval has elapsed, to automatically open the main switch and simultaneously reset the device to its original position for the next operation.

Other objects and advantages of the invention will appear more fully hereinafter from the following detailed description, taken together with the accompanying drawings, in which:

Fig. 8 is a front view of the safety device adapted for use in combination with the temperature-responsive means;

Fig. 9 is a side elevation of Fig. 8 with the lower end of the safety device inserted in the mercury-receiving well for rendering the safety device effective;

Fig. 10 is a view similar to Fig. 7 showing the combined temperature-responsive means and safety device inserted in one of the heater elements;

Fig. 11 is a diagrammatic view showing the control circuit and the relation of the various elements and their connection in the circuit;

Fig. 13 is a diagrammatic view of the device of Fig. 12; and

Fig. 14 is a side elevation of Fig. 12.

Figure 1:
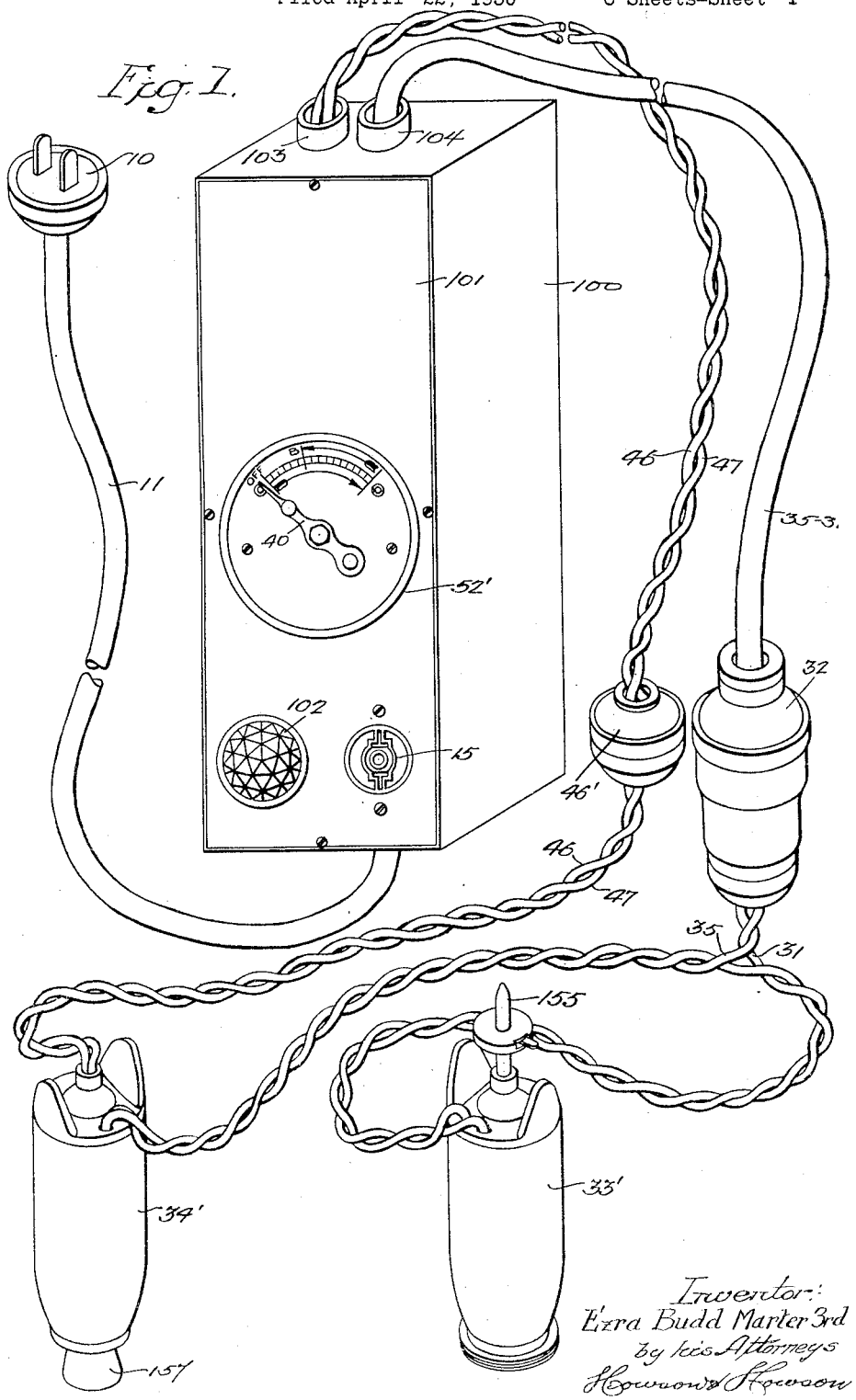
Fig. 1 is a perspective view of the control device with the heater elements attached.

As will be noted from the drawings, the hair-waving apparatus comprises a plurality of electric heater elements in series-circuit relation with each other which are adapted to be heated by an electric current, the current passing through each element being the same and consequently the temperature in each element being the same. The difficulty heretofore has been that due to variations in voltage of the heating current, the time interval necessary for successful permanent waving has varied so that it was really unknown as to how long the heater elements should be on in any given locality. If anything happened to require the attention of the operator elsewhere, the heater stayed on and, in the meantime, the person's hair would likely be burned. Furthermore, permanent waving is not a success where the heating current is turned on and off after any substantial interval occurs in between wherein the heater elements are allowed to cool. These undesirable results are overcome in the present invention by the provision of means which operates automatically to maintain a uniform temperature at the heater elements for any given predetermined period of time, so that the heater elements are automatically disconnected regardless of the presence of the operator when the heating application is completed. It will be noted that the hazard to which the person, whose hair was being waved, was subjected in the event that the operator of the machine should inadvertently leave for a long period of time, is entirely eliminated.

Referring to Fig. 11 of the drawings, the apparatus comprises a plug 10 adapted to be inserted into a standard receptacle (not shown) to provide electric current, either direct or alternating, by means of the conductors 11 to the main switch 12 which is connected to the conductors by means of the terminals 13 and 14. A receptacle 15 is provided for plugging auxiliary apparatus to the line, such as a hair-drying device or sun-lamp. The receptacle is connected to the conductors 11 by means of the terminals 16 and 17. The switch 12 is adapted to close the terminals 13 and 14 with terminals 18 and 19 across which is connected a pilot light 20 by means of the terminals 21 and 22 to indicate when the circuit is closed. The closing of the switch 12 completes a circuit from the terminal 13 to terminal 18 through the conductor 23, the terminal 24, contact 25, the contacts 26 and 27 of the normally closed relay 28 through the contact 29, terminal 30, conductor 31, receptacle switch 32, through the heater elements 33, the "master" heater element 34, through conductor 35, back through the receptacle switch 32, conductor 36, terminal 37 of the relay coil 38, conductor 39 and back to the switch through terminal 19 to terminal 14. The switch 12 is closed by means of an indicating knob 40 on the time clock 52 and which, when turned on, simultaneously winds the clock mechanism and, by the action of the mechanism 41 which will be described more fully hereinafter, actuates the switch 12. The indicator knob 40 may then be adjusted for any predetermined time interval. The current now being turned on, the heater elements 33 and 34 become energized and are heated until the temperature rises to a predetermined value, as determined by the temperature-responsive means, in the present instance, a thermometer 42. When the temperature rises to the desired value, the mercury 43 of the thermometer 42 rises to close the contacts 44 and 45 which closes a circuit through conductors 46 and 47 through the terminal 24, conductor 23, terminals 18 and 19 of switch 12, conductor 39, terminal 37, through the relay winding 38, terminal 48 back to conductor 47. The energization of the relay 38 causes the contact switch 28 to be attracted thereby against the tension of the spring 49, thus breaking the energizing circuit across the contacts 25 and 29. Simultaneously with the attraction of the contact arm 28, the arm 50 is actuated on its pivot 51 to release a mechanical brake from the balance wheel not shown) of the clock mechanism 52, thus setting the clock in operation. In the meantime, as the temperature of the heater elements decreases, the contacts 44 and 45 are broken causing the deenergization of the relay 38 and causing the contact arm 28 to close the contacts 25 and 29 by the spring 49, the arm 50, however, remaining in the position to which it had been actuated so that once the clock mechanism has been actuated, it is not interferred with by the operation of the contact arm 29 to open and close the heater circuits in accordance with temperature variations. However, after the predetermined time interval has elapsed, the clock mechanism causes the switch 12 to be opened by means of the connecting mechanism 41 and, simultaneously, the switch 12 resets the arm 53, so that the clock mechanism is set into position to be restarted for the next operation when the switch 12 is closed and the contact arm 28 again actuated after the desired temperature is reached, as indicated by the temperature-responsive means 42. A further provision is made to prevent the heating elements 33 and 34 continuing to be energized in case the thermometer 42 may be broken.

In the event that this happened, the contacts 44 and 45 would not become closed, and would cause a rise in the temperature of the heater elements beyond the danger point, the results of which might be disastrous. To this end, a pair of conducting elements or fingers 54 and 55 are provided in parallel-circuit relation with contacts 44 and 45 so that, on the breaking of the thermometer 42, the mercury 43 will be released and collected by the well 56. The collection of the mercury in the well 56 will cause the closing of the contact points 57 and 58 of the conducting elements 54 and 55, thereby closing the circuit of the relay 38 to break the contacts 25 and 29 by means of the contact arm 28. The construction of this mechanism will also be described more fully hereinafter.

Referring to Fig. 13, a modified control circuit is shown in which a transformer 59 is used to step down the voltage of an alternating-current supply furnished through the plug 10 and conductors 11. The clock-actuating mechanism and the switch-actuating mechanism are also modified, the construction of which will be explained more fully hereinafter from Figs. 12 and 14. In this circuit, (Fig. 13), the primary 60 of the transformer 59 is energized by means of conductors 61 and 62 from terminals 63 and 64 when the switch 65 is closed, which closes the terminals 67 and 68 of the conductors 11. The pilot lamp 20 is connected in series with the primary 60 by means of the terminals 21 and 22. The closing of the switch 65 causes the energization of the heater elements from terminal 63 through conductor 69, terminal 70', contact 70, through contacts 71 and 72 of the contact arm 73, through the contact 74, terminal 74', conductor 75, terminal 76, conductor 77 through the heater elements, (not shown) returning via conductor 78 to terminal 79 and through conductor 80 back to terminal 64. The temperature-control circuit is made from secondary 81 through conductor 82, terminal 83, conductor 84, through the thermometer, (not shown), returning via conductor 85 to terminal 86, through conductor 87 to terminal 89, through the winding of relay 90 to terminal 91, through conductor 92 and back to the secondary 81. The circuit of the secondary 81, of course, is not closed until the heaters have reached a predetermined temperature, causing the thermometer to close its contacts, thereby closing the secondary circuit through conductors 84 and 85, which causes the energization of the relay 90 and breaking of the contact 70 and 74 in the same manner as in the circuit illustrated in Fig. 11. In this instance, the clock mechanism 92 operates in a slightly different manner from the clock mechanism 52 in that the clock is wound separately by means of the knob 93 and the switch 65 is closed separately. The closing of the switch 65, however, causes the arm 66 to move the rack 94 downward, actuating the pinion 95 against the tension of a spring (shown in Fig. 14), causing the rack 94 to become locked by means of the cross bar 95. The clock is started in the same manner as in Fig. 11 by a lever 96 pivoted at 97 to release the mechanical brake 98 from the balance wheel 99. The knob 93 is set for the desired time interval and, as the clock is actuated, the knob begins to rotate until the predetermined time interval has elapsed, at which time, a pin on the knob 93 actuates the bracket 95, causing the release of the rack 94 by means of the spring-wound pinion 95, thereby applying the brake 98 to the balance wheel 99 and resetting the lever 96 to its original position against the contact arm 73.

Referring to Figs. 1 to 4, the construction and details of the apparatus disclosed in the diagram of Fig. 11 may be described as follows,—A suitable metal casing 100 is provided which encloses the clock mechanism 52, the switch 12, the relay 28, the pilot lamp 20 and the necessary terminals to connect the various elements in accordance with the diagram of Fig. 11. The casing 100 is provided with a cover 101 on which is mounted the dial 52' and through which extends the shaft 40' of the pointer 40 of the clock mechanism. A colored lens 102 is provided on the cover, in back of which is located the pilot lamp 20. The lens may be red or any other suitable color to indicate to the operator when the heater circuit is on and the pilot lamp 20 is illuminated. The conductors 11 from the plug 10 are lead into the casing from one end thereof through the opening 102' and the conductors 46 and 47 are led from the casing through opening 103 to the master heater 34', in one side of which is located the control thermometer 42. The conductors 35, 31 are in the form of a cable which leads out from the casing 100 through an opening 104 to supply electric current to the heater elements 33 and 34 located in the curling devices 33' and 34', respectively.

Figure 2:
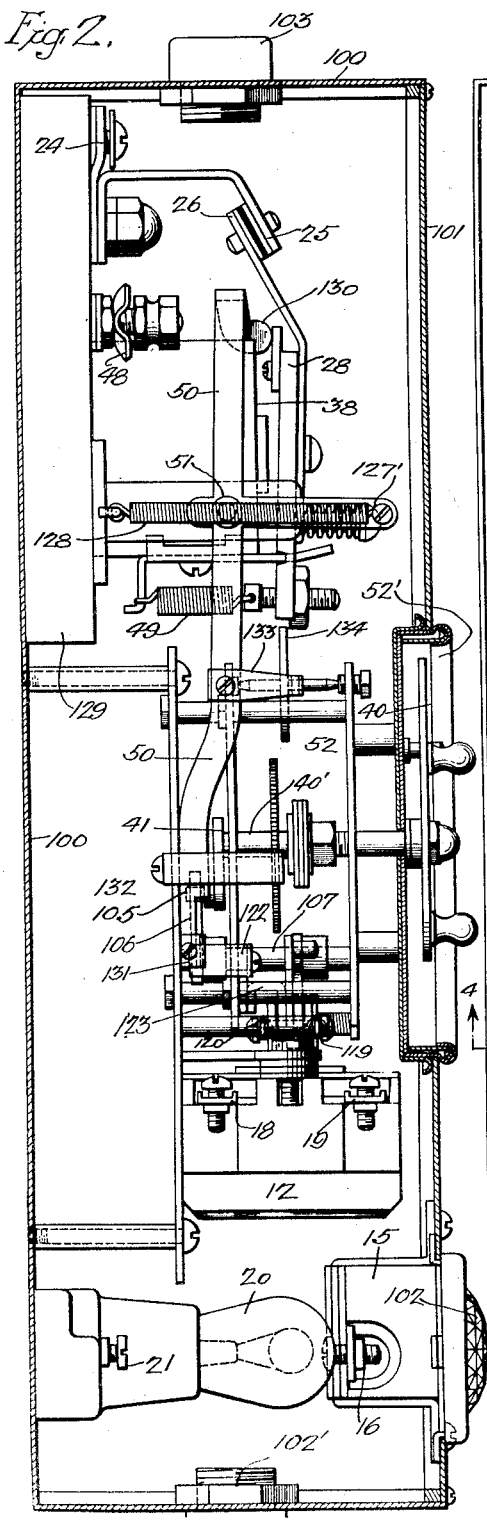
Fig. 2 is a side view of the control device taken from the left side of Fig. 1 with the side wall removed.
Figure 3:
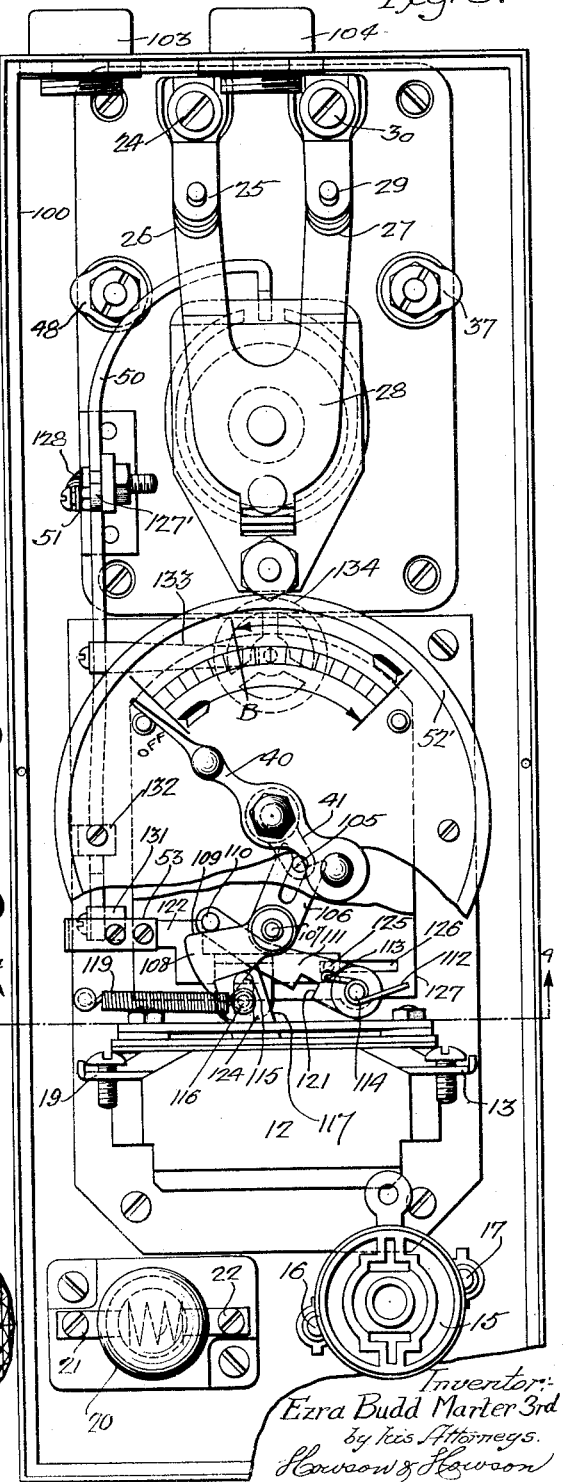
Fig. 3 is a front view of Fig. 1 with the cover removed.
Figure 4:
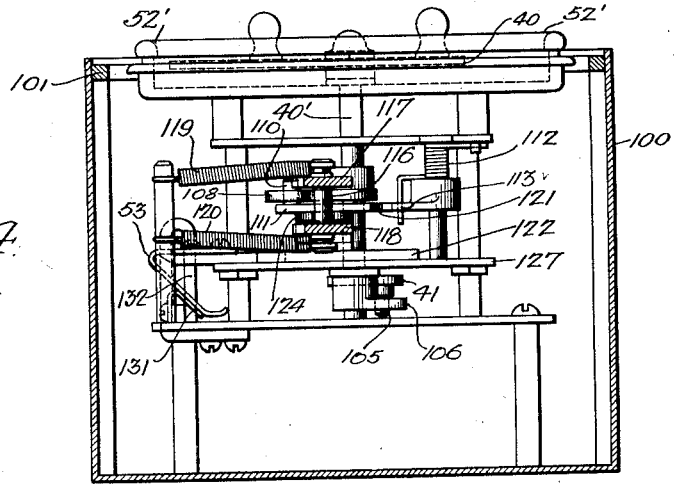
Fig. 4 is a sectional view taken along the line 4—4 of Fig. 3.

Referring to Figs. 2, 3 and 4, the clock mechanism 52 may be of any general type and it is believed not to require a detailed description thereof. The rotation of the pointer 40 in a clockwise direction causes a winding of the clock mechanism and simultaneously, by means of the lever 41 which is rigidly attached to the shaft 40', on which is mounted a pin 105, it causes the closing of the switch 12 by means of the forked element 106 which is rigidly mounted to shaft 107, whereby the motion of the forked element 106 causes the rotation of the shaft 107. The rotation of the shaft 107 causes a cam element 108 to be actuated by virtue of it also being rigidly mounted on the shaft 107 and rotatable therewith. Against one edge 109 of the cam element 108, a pin 110 of the locking arm 111 is adapted to bear by the action of the spring 112 which is secured to the arm 111 at 113 and to the pivot pin 114. The opposite edge 115 of the cam 108 is adapted to bear against a pin 116 which extends between a pair of spaced lever elements 117 and 118 and projecting therethrough so that springs 119 and 120 may be attached to the extremities of the pin, (Fig. 4). The motion of the pointer 40 in a clockwise direction causes the motion of the lever 41 on the shaft 40' in the same direction to engage the forked element 106 whereby the shaft 107 is caused to rotate, carrying with it the cam element 108 so that its edge 115 bears against the pin 116 to move the switch levers 117 and 118 against the tension of the springs 119 and 120 until the pin falls directly under the recess 121 of the locking lever 111. The motion of the cam 108 permits the pin 110 on the lever 111 to travel downward along the edge 109 of the element 108 by the action of the spring 112 so that the recess 121 engages the pin 116, thereby locking the switch levers 117 and 118 in closed position to close terminal connections 13, 14 and 18, 19. A bracket 122 is provided to which is attached a U-shaped member 123 by soldering or riveting, the front face of which presents a fork 124 which is in continual engagement with the pin 116. The bracket 122 is provided with a pin 125 which is adapted to slide in a slot 126 on the plate 127. As the pin 116 is forced to move against the tension of the springs 119 and 120, it causes the fork 124 to move with it, carrying with it the bracket 122. Attached to the bracket 122 is the arm 53 which is bent downward and inward to form an acute angle with the main body thereof, as shown in Fig. 4. The arm 53 causes the actuation of the arm 50 which is pivoted at 51. The arm 50 is adapted to swing on its pivot 51 in a direction in a plane perpendicular to the plane of the paper in Fig. 3 or right and left in the view of Fig. 2. The arm 50 is provided with a projection 127' at right angles thereto to which is attached a spring 128, the other end of which is secured to a base 129. The function of the spring 128 is to cause the positive motion of the arm 50 on either side of dead center of its pivot 51 when actuated by the contact arm 28 in one direction or by the arm 53 of the bracket 122 in the reverse direction. The arm 50 is provided with a projecting portion 130 at one end thereof which is adapted to contact with the arm 28 when the arm is actuated by the solenoid or relay 38. The other end of the arm 50 is provided with an angular member 131 adapted to come in contact with and slide against the angular arm 53 of the bracket 122 when the pin 116 is released by the locking arm 111, causing the arm 50 to be returned to its normal position against the contact arm 28. The motion of the arm 50 is limited by means of the bracket 132. Attached to the arm 50 is a brake arm 133 which is adapted to bear against the balance wheel 134 of the clock mechanism 52 when the projection 130 is bearing against the contact arm 28, and the contacts 25—26 and 27—29 are in their normally closed position.

The operation of the apparatus may be summed up as follows,—Referring to Fig. 1, the pointer 40 is moved from the "off" position in a clockwise direction, as indicated by the lower arrow, and then returned in a counterclockwise direction to the position B, indicated by the upper arrow. As the pointer 40 is turned in the clockwise direction, it causes the lever 41 to rotate with shaft 40' to engage the fork 106 by means of the pin 105, whereby the shaft 107 is rotated, carrying with it the cam member 108 which permits motion of the pin 110 along the edge 109 by virtue of the locking arm 111 being caused to move downward, by the action of the spring 112, to engage the pin 116 in the recess 121. Contacts 13, 14 and 18, 19 are now closed and the heater elements 33 and 34 become energized. As soon as the desired temperature is reached at the heater element 34, the mercury thermometer 42 (Fig. 11) causes the closing of the contacts 44 and 45, thereby energizing the relay 38 (Figs. 2 and 3) and the energization of the relay 38 causes the attraction of the contact arm 28 thereby, thus breaking the contacts 25, 26 and 29, 27 and simultaneously striking the projecting portion 130 of the arm 50, causing the arm to be moved to the left (Fig. 2), thereby releasing the brake 133 from the balance wheel 134, causing the clock to become operative. The clock now runs, moving with it the pointer 40 in a counterclockwise direction until the pointer reaches the "off" position. As the pointer is slowly moving in a counterclockwise direction, it causes the cam element 108 to be moved so that its edge 109 contacts with the pin 110, thereby moving the locking arm 111 to a raised position and when the pointer 40 reaches the final "off" position, the arm 111 is raised sufficiently to permit the escapement of the pin 116 from the recess 121 by the action of the springs 119 and 120, thereby returning the switch 12 to its "off" position and breaking the contacts 13, 14 and 18, 19. Simultaneously with the opening of the switch, the pin 116 causes the forked element 124 to move to the left, carrying with it the bracket 122 to which is attached the arm 53. The arm 53 immediately strikes the element 131 of the arm 50 and with the aid of the spring 128 is carried beyond its dead center point on the pivot 51, causing the projecting portion 130 to be returned to its normal position in contact with the arm 28. Obviously, the pilot lamp 20 is extinguished when the switch 12 is in its "off" position. Thus, it will be seen that an effective timing mechanism is provided whereby the main circuit is automatically broken after a predetermined time has elapsed without necessitating the attention of the operator. It also provides a positive timing means by means of which may be afforded a uniform time interval for carrying out the hair-waving operation.

Figure 12:
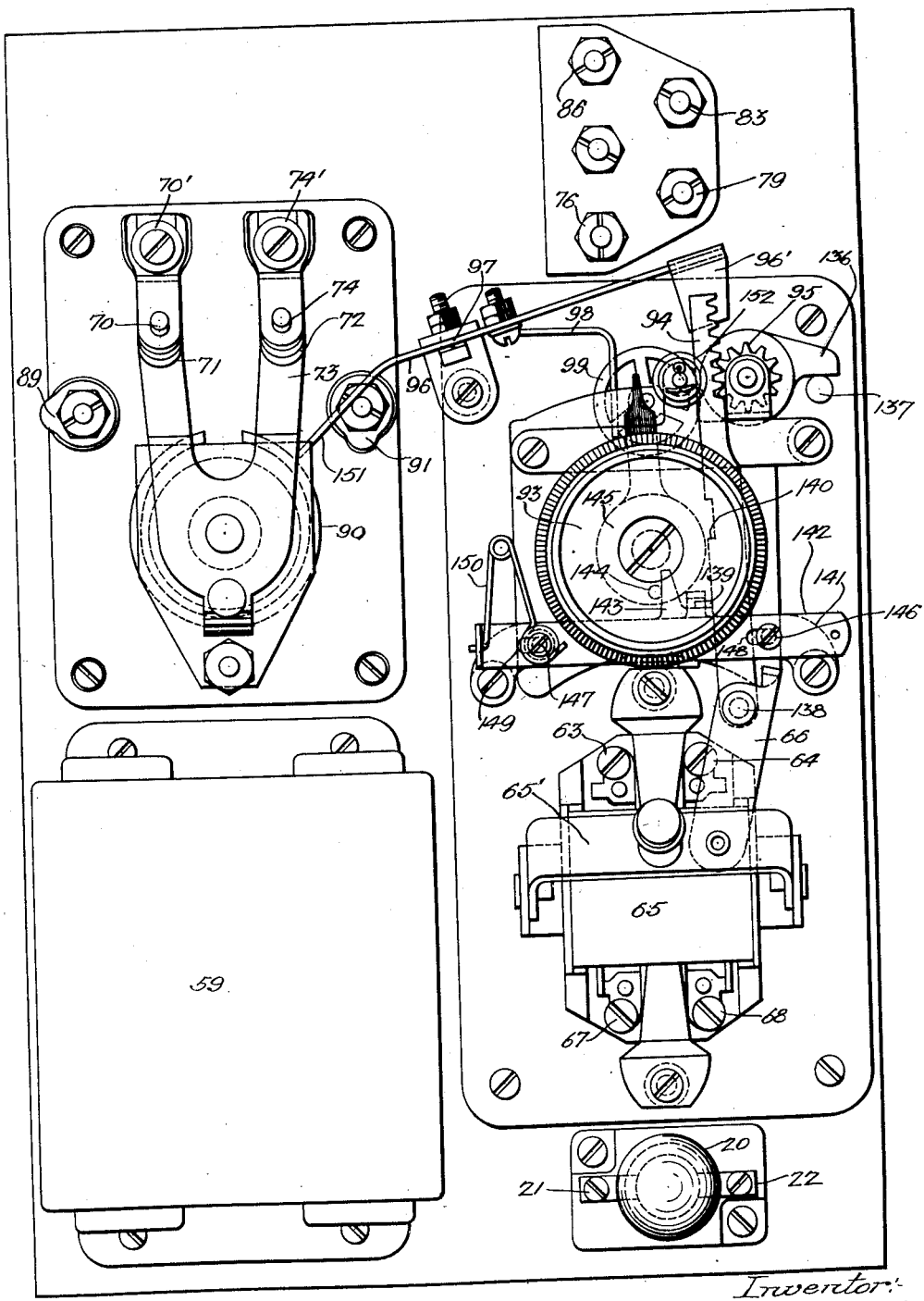
Fig. 12 is a plan view of a modification of the control device.

In Figs. 12 and 14 is shown the modified apparatus which is illustrated schematically in Fig. 13. In this modification, a switch 65 is closed independently by means of the cross-arm 65' to close the terminals 63, 67 and 64, 68, respectively. As the cross-arm 65' is moved downward to close the switch, a lever 66, one end of which is pivotally attached to the cross-arm 65', is moved therewith, and the other end of which is pivotally attached to a rack 94. As the rack 94 moves downward by the motion of the lever 66, it actuates the pinion 95 against the tension of a coiled spring 135 (Fig. 14), moving with it the finger 136 which normally bears against a stop pin 137. As the rack 94 is moved downward, by reason of its pivotal connection at 138 to the arm 66, it is given a transverse motion to the left, causing a projecting element 139 to engage the recess 140 on the rack 94, thereby locking the rack 94 in its lowered position. The projection 139 is carried by the lower cross-bar 141 which is fixed and is integral therewith. The upper cross-bar 143 which is movable on pins 146 and 147 attached to the lower cross-bar 141 and extending through slots 148 and 149 carries a finger 142 which is adapted to be actuated by the pin 144 which is mounted on a collar 145 underneath the knob 93 and on the same shaft therewith, the function of the finger 143 being to release the rack 94 by moving it to the right so that the projection 139 and the recess 140 of the rack are disengaged. Motion of the finger 143 causes the cross-bar 142 to move to the right on the pins 146 and 147 by reason of the slots 148 and 149. However, as soon as the pin 144 is turned away from the finger 143, the cross-bar 142 is returned to its normal position to the left by the action of the spring 150 which is secured to one end of the cross-bar and to the pin 147. As the rack 94 is released, the pinion 95 causes it to be actuated to the raised position by the action of the coiled spring 135. The motion of the pinion 95 is limited by means of the finger 136 striking the stop pin 137. As the rack 94 is actuated to its raised position, it is caused to strike the projection 96' carried by the arm 96 which is pivoted at 97, causing it to move in a plane perpendicular to the plane of the paper and carrying with it the brake arm 98, causing it to stop the motion of the balance wheel 99 of the clock mechanism, simultaneously returning the other end 151 of the rod to its normal position against the contact arm 73 of the relay 90 which, in this instance, is energized from the secondary of transformer 59, the primary of which is connected to the terminals 63 and 64 of the switch 65. The pilot lamp 20 is connected in series with the primary of the transformer 59 by means of the terminals 21 and 22, as indicated in Fig. 13.

The operation of the device of Figs. 12 to 14 may be summed up as follows,—The switch lever 65' of the switch 65 is manually actuated to the lowered position, whereby the contacts 63, 67 and 64, 68 are closed, simultaneously pulling the lever arm 66 with it and causing the rack 94 to move downward, actuating the pinion 95 against the tension of the coil spring 135 and locking the rack 94 against the projection 139 by means of the recess 140. The knob 93 is then rotated in a clockwise direction to cause the winding of the clock mechanism, thereby moving the pin 144 out of contact with the finger 143. The knob 93 is then adjusted for the predetermined time interval so that, in the required time, the pin 144 will come in contact with the finger 143. The switch 65 being closed, the heater elements become energized and the temperature rises until it reaches a predetermined value as in the previous case, at which time, the temperature-responsive means closes the circuit of the relay 90 through the secondary of the transformer 59, thereby energizing it and causing the contact arm 73 to break the contacts 70, 71 and 72, 74. Simultaneously with the breaking of said contacts, the contact arm 73 strikes the end 151 of the arm 96, causing the brake arm 98 to be released from the balance wheel 99 of the clock mechanism thereby rendering the clock operative. The clock then runs until the predetermined time interval has elapsed, at which time, the knob 93 has moved to such a position that the pin 144 on the collar 145 strikes the finger 143, thereby moving the rack 94 to the right so that the projection 139 is disengaged from the recess 140. The action of the coiled spring 135 causes the rotation of the pinion 95 which imparts an upward motion to the rack 94, causing it to strike the projection 96' and applying the brake 98 to the balance wheel 99 thus stopping the clock mechanism. In the next starting operation, the knob 93 is again rotated in a clockwise direction and the finger portion 143 is moved to the left by the action of spring 150 on the upper cross-bar 142. The rack 94 is prevented from becoming disengaged from the pinion 95 by means of the wheel 152 bearing against it.

It is obvious that if it is not desired to heat the heater elements for any predetermined time interval after the desired temperature has been reached the clock mechanism may be dispensed with and a direct connection made from the contact arms 28 and 73 to the switches 12 and 65 respectively to cause the switches to be opened when the thermometer contacts 44 and 45 are closed and the relays 38 or 90 energized. In some cases in which the waving process may be modified this may be desirable when only the time interval required to bring the heater elements to the required temperature is utilized.

Figure 5:
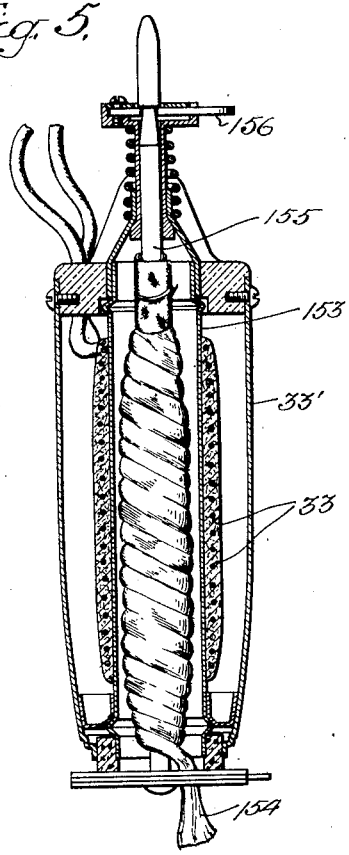
Fig. 5 is a cross sectional view of one of the heater elements.

Referring to Figs. 5 to 10, inclusive, the heater elements will now be described. In Fig. 5 is shown one of the curling elements 33' of Figs. 1 and 11, in which the heating elements 33 are located, which comprises a coil of wire imbedded in insulating material and mounted on a cylindrical body 153 into which a strand of hair 154 curled on a pin 155 and properly treated is adapted to be inserted. The pin 155 is adapted to be locked in position by means of a collar 156. The curling element 33' may be of any known type other than that shown, inasmuch as the structural details thereof are immaterial to the present invention as long as the heater elements 33 are connected in proper circuit relation with the control apparatus, as indicated in Figs. 11 and 13. The "master" heater element or control element 34' is similar in construction to the curling elements 33 except that the pin 155 is omitted and in its place the thermometer 42 is inserted which is supported, in the present instance, on a cork 157 by means of a wire bracket 158 provided with collars 159 and plugged into the lower end of the container. Mounted on the stem of the thermometer 42 are contact rings 44' and 45' which are provided with platinum contact points 44 and 45 (not visible) which extend into the stem so as to contact with the column of mercury 43 when the column is raised by the heat produced in the container. A small quantity of oil may be provided at the top of the mercury column to prevent arcing across the contact points. The contact ring 44' and 45' are connected to conductors 47 and 46, respectively, which lead to the windings of relays 38 or 90. Obviously, the thermometer 42 may be replaced by a thermostat without departing from the scope of the invention.

Figure 6:
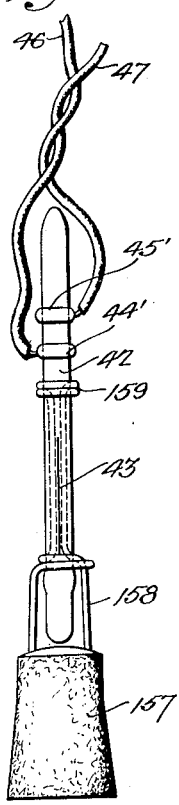
Fig. 6 is a view of the temperature-responsive means for controlling the temperature of the heating elements.
Figure 7:
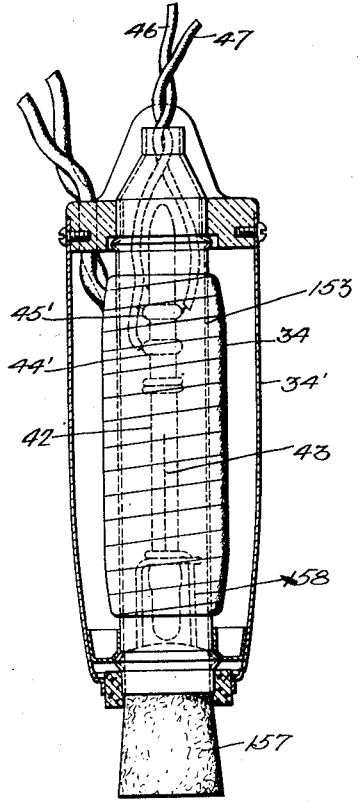
Fig. 7 is a view showing the temperature-responsive means inserted in position in one of the heater elements.

Figs. 8 to 10 illustrate the safety device in combination with the thermometer 42 which is not shown in Figs. 6 and 7. The safety device comprises a pair of conducting fingers 54 and 55 mounted on an insulating strip 161 by means of screws 164 and 165 and connected in shunt relation with the contact rings 44' and 45' by reason of the ends 162 and 163 of the conductors 46 and 47 being electrically connected to the fingers instead of being directly connected to the rings 44' and 45'. The insulating strip 161 is held rigidly in a plug member 166 which is provided with a passage 167 for passing the conductors 46 and 47 therethrough. In this instance, the thermometer is mounted on the strip 161 by means of the strap 160 instead of the cork 157 and the bracket 158, shown in Figs. 6 and 7. The ends 57 and 58 of the conducting fingers 54 and 55 are arranged to extend into a mercury-receiving well 56 of insulating material which is also adapted to plug into the lower end of the container 34' which is provided with the heating element 34 and surrounds the thermometer 42. The conducting fingers 54 and 55 are relatively close to each other without actually touching so that only a small particle of mercury dropping into the well 56 will short-circuit the ends 57 and 58 of the conducting fingers, whereby the circuit of the relay windings may be closed and the contacts of the relay broken, thus causing the deenergization of the heater elements. Thus, it will be seen that with this safety device provided, it will be impossible for the heater elements to become overheated in the event that the thermometer is broken, which may happen in the handling of the apparatus in applying the curlers to the hair.

The thermometer of the safety device may be replaced by a thermostat comprising two pairs of elements set at the same temperature to assure positive deenergization of the heater elements. One pair of the thermostat elements may be set 10° higher than the other so that if one varies, the other will function to prevent the heater elements from becoming overheated.

While I have shown only two modifications of my invention for the purposes of illustration and description and to set forth the operation thereof, other changes and modifications therein may be apparent to those skilled in the art without departing from the scope of the invention and I, therefore, desire to be limited only by the scope of the appended claims.

I claim:

1. Apparatus of the character described, comprising a plurality of electrical heating elements, an energizing circuit therefor, a switch in said circuit, a temperature-responsive device disposed adjacent one of said heating elements, a relay comprising an energizing winding in circuit with said temperature-responsive device and a movable contact arm normally closing said energizing circuit, whereby said relay and said temperature-responsive device control energization of said heating elements in accordance with the temperature thereof, a timing device, means operable by said contact arm for starting said timing device when said relay operates to deenergize said heating elements at a predtermined temperature, and means operable by said timing device for opening said switch to open said energizing circuit after a predetermined interval of time.

2. Apparatus of the character described, comprising a plurality of electrical heating elements, an energizing circuit therefor, a switch in said circuit, a temperature-responsive device disposed adjacent one of said heating elements, a relay comprising an energizing winding in circuit with said temperature-responsive device and a movable contact arm normally closing said energizing circuit, whereby said relay and said temperature-responsive device control energization of said heating elements in accordance with the temperature thereof, a timing device, a movable arm arranged for actuation by said contact arm when said relay operates to deenergize said heating elements at a predetermined temperature, means operable by said movable arm for starting said timing device, and means operable by said timing device for opening said switch and returning said movable arm to normal position after a predetermined interval of time.

3. Apparatus of the character described, comprising a main electrical circuit, a switch in said circuit, a pair of branch circuits connected in parallel across said main circuit, a plurality of heating elements connected in one of said branch circuits, a temperature-responsive device disposed adjacent one of said heating elements and connected in the other of said branch circuits, a relay comprising an energizing winding connected in said other branch circuit and a movable contact arm normally closing said one branch circuit, whereby said relay and said temperature-responsive device control energization of said heating elements in accordance with the temperature thereof, a timing device, means operable by said contact arm for starting said timing device when said relay operates to deenergize said heating elements at a predetermined temperature, and means operable by said timing device for opening said switch to open said main circuit after a predetermined interval of time.

4. Apparatus of the character described, comprising a main electrical circuit, a switch in said circuit, a pair of branch circuits connected in parallel across said main circuit, a plurality of heating elements connected in one of said branch circuits, a temperature-responsive device disposed adjacent one of said heating elements and connected in the other of said branch circuits, a relay comprising an energizing winding connected in said other branch circuit and a movable contact arm normally closing said one branch circuit, whereby said relay and said temperature-responsive device control energization of said heating elements in accordance with the temperature thereof, a timing device, a movable arm arranged for actuation by said contact arm when said relay operates to deenergize said heating elements at a predetermined temperature, means operable by said movable arm for starting said timing device, and means operable by said timing device for opening said switch and returning said movable arm to normal position after a predetermined interval of time.

EZRA BUDD MARTER, 3D.